United States Patent [19]

Turatti

[11] 4,332,306
[45] Jun. 1, 1982

[54] SAFETY SYSTEM FOR A MOTOR VEHICLE STEERING LOCK

[76] Inventor: Mario Turatti, Via XXV Aprile 46, Nichelino, Turin, Italy

[21] Appl. No.: 125,316

[22] Filed: Feb. 28, 1980

[30] Foreign Application Priority Data

Mar. 5, 1979 [IT] Italy .............................. 67468 A/79

[51] Int. Cl.³ ............................................ B60R 25/02
[52] U.S. Cl. ..................................... 180/287; 70/252; 307/10 AT
[58] Field of Search ............... 180/287, 271, 170, 289; 70/252; 307/10 AT

[56] References Cited

U.S. PATENT DOCUMENTS

| | | | |
|---|---|---|---|
| 3,468,168 | 9/1969 | Colling | 180/170 X |
| 3,629,817 | 12/1971 | Hill | 180/287 X |
| 3,641,489 | 2/1972 | Shimomura | 180/287 X |
| 3,647,016 | 3/1972 | Fitzsimons et al. | 180/271 |
| 3,802,531 | 4/1974 | Schiesterl | 180/287 X |
| 4,250,976 | 2/1981 | Mochida | 70/252 X |

Primary Examiner—Joseph F. Peters, Jr.
Assistant Examiner—Milton L. Smith
Attorney, Agent, or Firm—Sughrue, Mion, Zinn, Macpeak and Seas

[57] ABSTRACT

A safety system for motor vehicle steering lock incorporated in an ignition switch and including a steering lock bolt displaceable between a retracted position which it occupies when the ignition key is in the lock, and an extended position which it occupies when the ignition key is removed from the ignition switch. The safety system operates to lock the bolt in its retracted position whenever the vehicle is in motion, either by locking the ignition switch to prevent removal of the key or by directly engaging the bolt so that it cannot be displaced to the extended position even if the ignition key is removed from the ignition switch when the vehicle is moving. A detector device senses when the vehicle is in motion and supplies a signal to an electromagnet to effect locking.

10 Claims, 7 Drawing Figures

SAFETY SYSTEM FOR A MOTOR VEHICLE STEERING LOCK

The present invention relates to a safety system for an anti-theft steering lock for a motor vehicle. Steering locks are frequently fitted to motor vehicles as a deterrent to theft. Usually they are linked to an ignition and starter switch which is operable by means of a key in a lock having a rotatable cylinder. The steering lock is engaged whenever the key is removed from the ignition switch and can only be released by inserting the key into the ignition switch and turning it through a certain minimum angle.

A known type of steering lock has a bolt displaceable axially between a retracted position which it occupies when the key is in the ignition switch and appropriately turned, and an extended position in which it engages the steering column of the vehicle. The bolt is maintained in the retracted position by a rotatable cam turnable with the rotatable cylinder of the lock, and is urged towards the extended position by a spring. For safety reasons it is important that the steering lock cannot engage while the vehicle is in use and to achieve this the steering lock is arranged so that the bolt can only move into the extended, locking position when the ignition switch is turned off and the key removed. However, the possibility remains that, apart from possible failure of the mechanism, inadvertent or deliberate withdrawal of the ignition key from the ignition switch, after having turned the ignition off, can result in engagement of the steering lock with dangerous, and possibly disastrous consequences.

The technical problem to which the present invention relates is to provide a control system for an anti-theft steering lock of the general type described above, in which the safety means for preventing locking of the steering except when the vehicle is not in use shall be of greater security in operation than known such locks.

Accordingly, the present invention provides a safety system for a motor vehicle steering lock of the type incorporated in an ignition switch having an ignition switch lock which is operable by means of a key in a rotatable cylinder, the steering lock including a bolt displaceable between an extended position in which it engages the steering column of the vehicle and a retracted position in which it is spaced from the steering column, the said bolt being resiliently biased towards the extended position and displaced against this resilient biasing to the retracted position by a cam formed on or rigidly connected to the rotatable cylinder of the ignition switch lock, there being provided means to allow the displacement of the bolt from the retracted position to the extended position only when the rotatable cylinder of the ignition switch lock is turned to the position in which the ignition switch is turned off and the ignition key is removed, which is characterised in that the safety system comprises detector means for sensing whether the vehicle is in motion or is staationary, and operable to provide an output electrical signal representative of which of these conditions exists, an electronic circuit fed with the output signals from the said detector means and operable to process these signals to provide at its output a control voltage when the vehicle is in motion, and electromagnetic locking means energized by the output control voltage provided by the electronic circuit and operable, when so energized, to engage the steering lock in such a way as to prevent the displacement of the steering lock bolt from the retracted position to the extended position when the vehicle is in motion.

The present invention thus offers the advantage of complete security against operation of the steering lock while the vehicle is in motion. At the same time the value of the steering lock as a theft deterrent is not reduced.

In a preferred embodiment of the invention the said electronic circuit is operable to generate an output control voltage only if the key is turned in the ignition switch to turn the switch from the angular position at which the ignition circuit is switched on, towards the angular position in which the ignition circuit is switched off when the vehicle is moving, the said control voltage being generated whereby to energize the electromagnetic locking means after the ignition switch reaches the angular position in which the ignition circuit is switched off but before it reaches an angular position at which the key can be withdrawn. Such an arrangement has the advantage that the winding of the electromagnetic locking means is not energized all the time when the vehicle is in motion, but rather only when conditions arise requiring the additional security provided by the safety device. This permits the winding to be made a more economical size and also provides a saving of energy.

Various embodiments of the invention will now be described in more detail with reference to the attached drawings, which are provided purely by way of non-limitative example.

Figure 1:
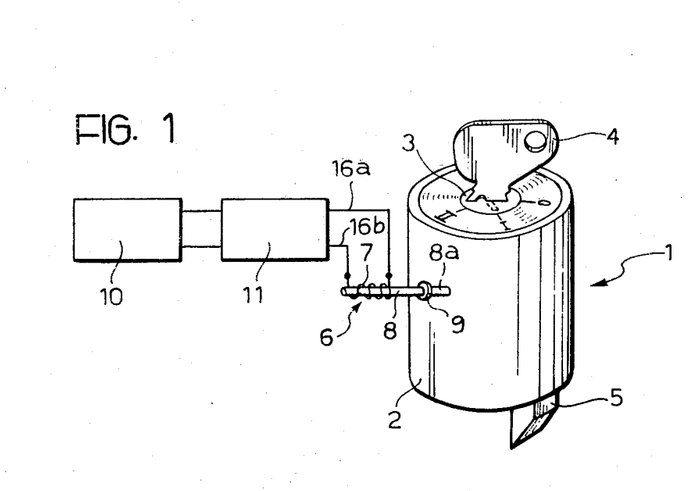
FIG. 1 is a general schematic diagram of the safety system according to the invention.

Referring now to the drawings, and particularly to FIG. 1, there is shown an anti-theft steering lock system incorporating a combined ignition and starter switch 1 of a motor vehicle. The switch contact arrangement does not form part of the present invention and will not be described. It may be of conventional form. The switch 1 has a casing 2 within which is located a rotatable cylinder lock 3 operable by means of a key 4. Insertion of the key 4 releases the cylinder 3 in a known way, allowing it to be turned between three angular positions respectively indicated O, I and II. When the cylinder is in the position O the switch contained in the casing 2 is turned off; when the cylinder is in the position I the ignition and ancillary equipment circuits are completed by the switch; and when the cylinder is in the position II the starter motor circuit is completed. The cylinder is spring biased so that upon release of the key 4 while in the position II the cylinder automatically returns to position I. Also carried within the casing 2 is a lock bolt 5 which is displaceable axially of the cylindrical casing 2 between a retracted, rest position and an extended, locking position in which it engages the steering column of the vehicle, or a member carried thereby, so as to lock the steering column against rotation.

The bolt 5 is advanced from the retracted position to the extended position in a known way upon withdrawal of the key 4 from the rotatable cylinder 3 when this is in the position O. Normally the key cannot be withdrawn when the cylinder 3 is in the positions I and II due to a mechanical interlock.

Outside the casing 2 there is located an electromagnet including an excitation winding 7 and a movable core 8. When the winding 7 is not excited the movable core occupies the position shown in solid lines in FIG. 1 and when the winding 7 is excited, the core 8 is displaced into the casing 2 through a hole 9 and occupies the position indicated in broken lines and identified 8a in FIG. 1. The core 8, when in the position 8a, prevents the displacement of the bolt 5 from the retracted position to the extended position, in a manner which will be described below with reference to FIGS. 2 and 3 which illustrate two different mechanical arrangements for effecting this locking.

The system of FIG. 1 includes a detector 10 operable to provide an output electrical signal indicative of whether the vehicle is moving or stationary. The signal at the output of the detector 10 is fed to an electronic circuit 11 which processes the signal and provides an output voltage across a pair of output lines 16a and 16b connected to the winding 7. The polarity of the output voltage from the electronic circuit 11 is such as to excite the winding 7 and consequently prevent the displacement of the bolt 5 into the extended position, when the vehicle is in motion.

Figure 2:
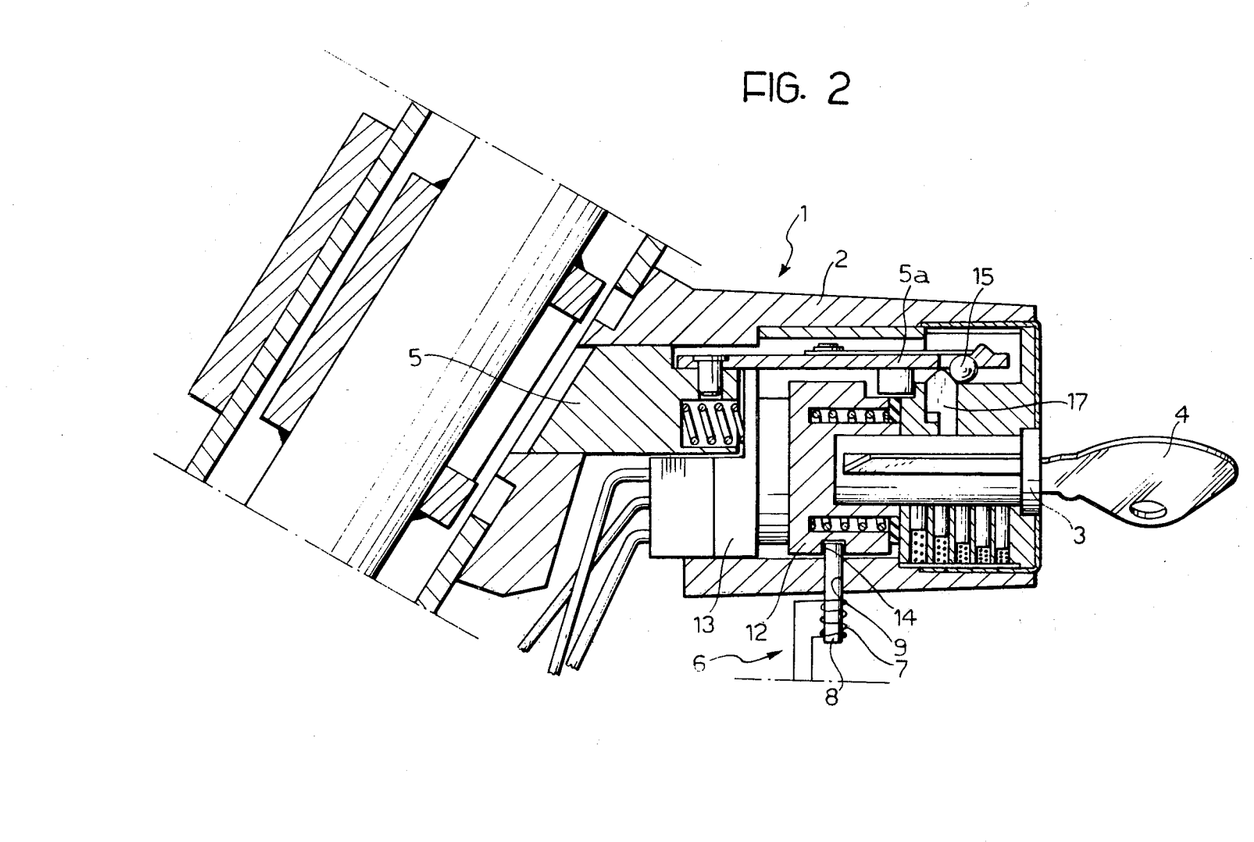
FIG. 2 is a partially sectioned view of part of one form of combined ignition switch and steering lock usable in the system illustrated in FIG. 1.

Referring now to FIG. 2 the device shown is of the type forming the subject of my Italian Pat. No. 895,981. In this device, when the winding 7 is excited, the movable core 8 of the electromagnet 6 engages in a recess 14 in a rotatable cam 12 which is rigidly connected for rotation with the movable cylinder 3 of the lock. In this arrangement, when the vehicle is moving and therefore an output signal from the detector 10 is generated to cause excitation of the winding 7, the displacement, by means of the key 4, of the rotatable cylinder 3 into the position O is prevented, and thus the key 4 cannot be removed from the ignition switch, such removal only being possible when the key 4 and cylinder 3 are in the position O.

The bolt 5 is prevented from being moved into the extended, locking position as long as the key 4 remains in the ignition switch by the effect of a safety device such as that described and illustrated in the above mentioned prior patent, this comprising a roller or ball 15 for locking a control bar 5a connected to the bolt 5 in a position corresponding to the retracted position of the bolt. The roller 15 is controlled by a probe 17 which is radially outwardly displaced by the key 4 when the key is in the ignition switch. Thus the engagement of the core 8 of the electromagnet 6 in the recess 14 indirectly prevents the displacement of the bolt 5 into the locking position by ensuring that the key 4 cannot be turned to the position O and removed. For the purpose of allowing the engine to be turned off when the vehicle is moving, the recess 14 is formed in the cam 12 in an angular position such as to allow the engagement of the core 8 into this recess 14 only when the rotatable cylinder 3 has been turned from the position I towards the position O by an angle sufficient to allow the interruption of the ignition circuit. Although the ignition and ancillary equipment circuits are turned off by the action the detector 10 and electronic circuit 11 are not so that the coil 7 remains excited even when the ignition is turned off.

Figure 3:
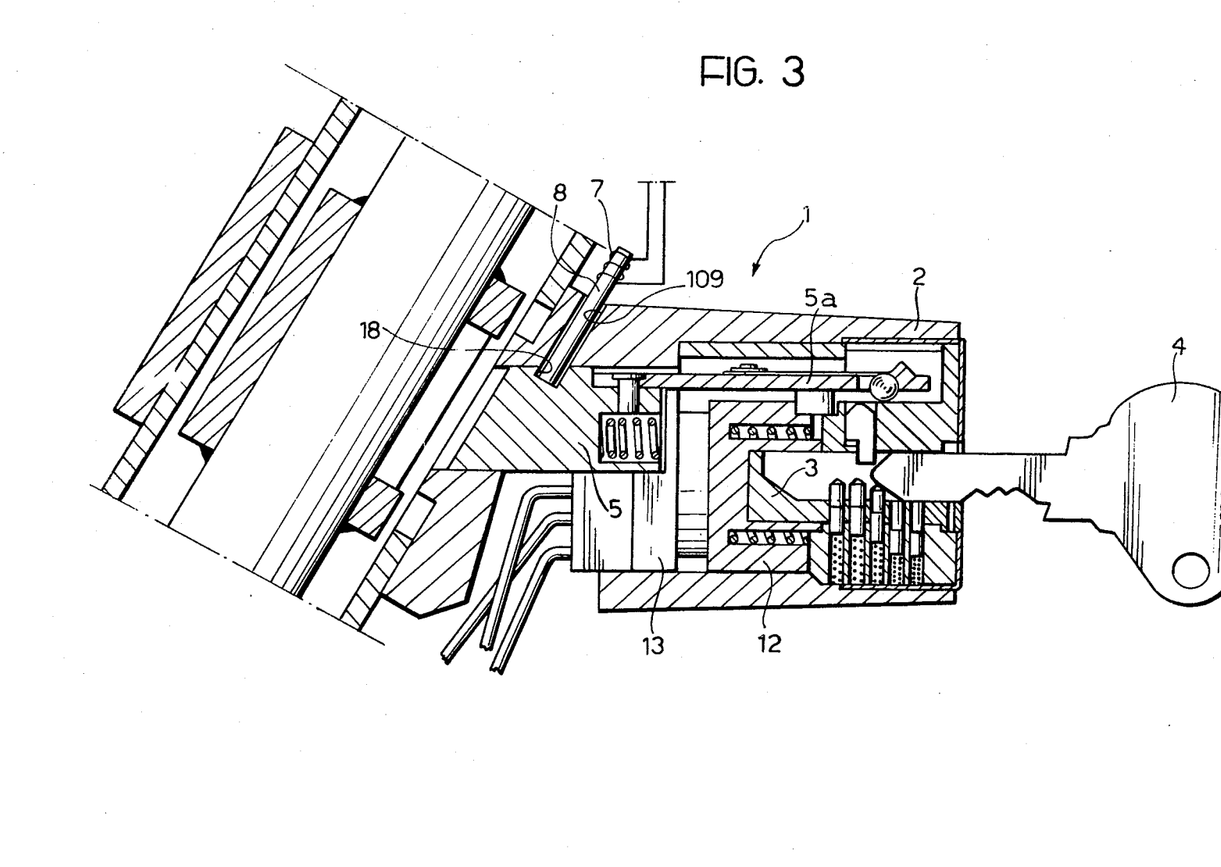
FIG. 3 is a partially sectioned view of a part of a second form of combined ignition switch and steering lock usable in the system illustrated in FIG. 1.

In FIG. 3 there is shown a similar device in which, when the winding 7 is excited, the movable core 8 of the electromagnet 6 passes through a hole 109 in the casing 2 and engages a recess 18 formed directly in the bolt 5. In this case, when the vehicle is in motion, the core 8 does not interfere with the displacement of the rotatable cylinder 3 into the position O, so that it is possible to remove the key 4; however, as long as the vehicle is in motion, the bolt 5 is prevented by the core 8 from becoming displaced into the extended locking position. The direct action of the core 8 on the bolt 5 guarantees safety against locking of the steering even in the event that the bolt 5 should become accidentally uncoupled from the associated control bar 5a.

Figure 4:
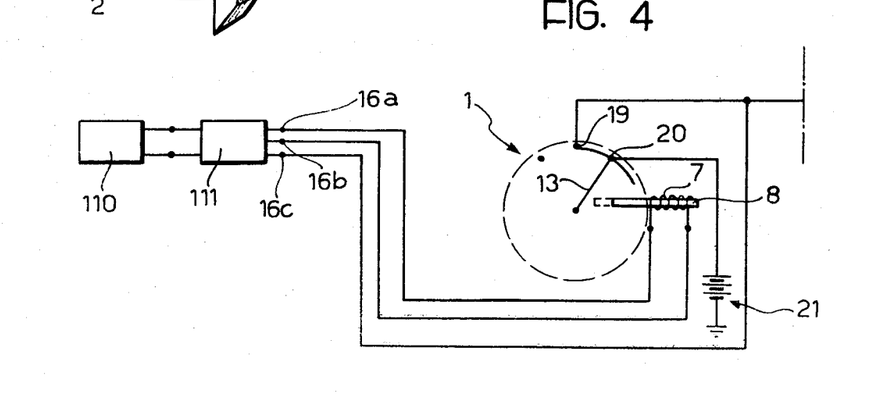
FIG. 4 illustrates a variant of the general system of FIG. 1.

In the system illustrated in FIG. 4 a detector 110, sensitive to whether the vehicle is moving or stationary, feeds at its output an electronic circuit 111 having, in addition to the output lines 16a, 16b connected across the winding 7, a supplementary output line 16c connected to a fixed contact 19 within the ignition switch. When the cylinder 3 is in the position I, the fixed contact 19 is electrically connected by a rotary contact 13 to a second fixed contact 20 connected to the positive terminal of the battery 21 of the vehicle. The significance of this connection will be appreciated from the following description of the detector and processing circuits 110 and 111.

Figure 5:
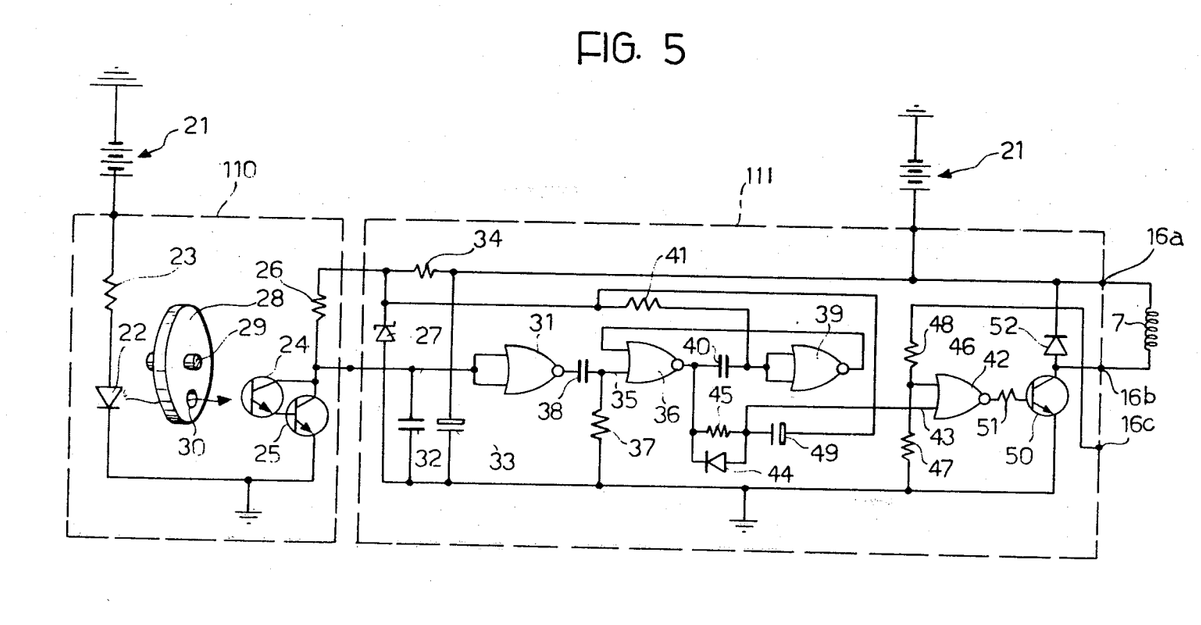
FIG. 5 illustrates a control circuit forming part of the system illustrated in FIG. 4.

Referring now to FIG. 5, there is shown a light emitting diode (LED) 22, one terminal of which is connected to the positive pole of the battery 21 through a resistor 23, and the other terminal of which is grounded. A phototransistor 24 is positioned to receive radiation emitted by the light emitting diode 22 periodically through an aperture 30 in a rotatable interceptor member 28. The emitter of the phototransistor 24 is connected to the base of a transistor 25, and its collector is connected to the collector of the transistor 25 and by means of a resistor 26, to the cathode terminal of a Zener diode 27.

Rotation of the rotatable interceptor is controlled by the movement of the vehicle in such a way that the member 28 rotates whenever the vehicle is moving, irrespective of whether the ignition is turned on or off. In the drawing the member 28 has been schematically represented in the form of a disc, rotatable on a shaft 29, and the light transmission aperture has been shown as a hole 30 the radial position of which is such that upon rotation of the disc 28 it periodically passes through the direct path of radiation from the diode 22 to the phototransistor 25. Consequently, whenever the vehicle is moving, the phototransistor 24 receives from the diode 22 a series of pulses at a frequency proportional to the speed of the vehicle, while when the vehicle is stationary the phototransistor 24 either continuously receives radiation emitted by the light emitting diode 22 (if the hole 30 has come to rest in the path of this radiation) or else does not receive any radiation (if the hole 30 is not in the path of the radiation).

The collector of the transistor 25 is connected to both inputs of a first NOR gate 31, and a capacitor 32 is connected between the inputs of the gate 31 and ground. An electrolytic capacitor 33 is connected between the battery 21 and ground. The cathode of the Zener diode 27 is connected to the battery 21 through a resistor 34 and the anode is connected to ground.

A first input 35 of a second NOR gate 36 is connected through an RC circuit constituted by a resistor 37 with one terminal grounded and a capacitor 38, to the output of the first NOR gate 31.

The two inputs of a third NOR gate 39, which are connected together, are connected via a capacitor 40 to the output of the second NOR gate 36. The output of the third NOR gate 39 is connected to the second input of the second NOR gate 36. A resistor 41 is connected between the input of the third NOR gate 39 and the cathode of the Zener diode 27.

A fourth NOR gate 42 has one input 43 connected by means of a circuit comprising a diode 44 in parallel with a resistor 45, to the output of the second NOR gate 36. The other input 46 of the fourth NOR gate 42 is connected to ground through a resistor 47 and to the output terminal 16c of the circuit through a resistor 48. An electrolytic capacitor 49 is connected between the said one input 43 of the fourth NOR gate 42 and the cathode terminal of Zener diode 27. The base of a transistor 50 is connected to the output of the fourth NOR gate 42 through a resistor 51. The emitter of the transistor 50 is connected to ground and the collector is connected to the battery 21, via a diode 52. The operation of the circuit described above is as follows:

When the vehicle is at rest, the transistor 25 is permanently either saturated or cut-off according to whether the hole 30 of the disc 28 is or is not in the path of the radiation emitted by the light emitting diode 22. Therefore, at the output of the first NOR gate 31, there is either a stable "zero" or else a stable "one" in dependence on whether the transistor 25 is saturated or cut off. In each case, the capacitor 38 ensures a "zero" at the input 35 of the second NOR gate 36 and, by the effect of the monostable circuit connection of the NOR gates 36 and 39, the output of the third gate 39 is also at the "zero" level. Consequently, the output of the second NOR gate is a "one", and the capacitor 49 is practically short-circuited by the output impedence of the second NOR gate 36 and the resistor 37. The input 43 of the fourth NOR gate 42 is therefore a "one", and consequently a "zero" appears at the output thereof so that the transistor 50 is cut off and the electromagnet 6 de-energized.

Therefore, independently of the position of the key 4, the movable core 8 of the electromagnet 6 remains in the rest position shown in solid outline in FIG. 4.

When the vehicle is in motion the disc 28 is driven to rotate and this causes the light path between the diode 22 and phototransistor 24 to be periodically broken. This generates a series of pulses at the input 35 of the second NOR gate 36, which periodically triggers the monostable circuit comprising the second and third NOR gates 36 and 39. Each time the monostable is triggered the electrolytic capacitor 49 is charged rapidly through the diode 44. Discharge of the capacitor 49 is impeded since this takes place through the resistor 45 and thus the capacitor 49 remains charged for as long as the vehicle remains in motion, and for some time after stopping. The charged state of the capacitor 49 causes a permanent "zero" to appear at the input 43 of the fourth NOR gate 42.

If the key 4 is in the position I, the input 46 of the NOR gate 42 is connected to the positive terminal of the battery 21 by means of the resistor 48, the output 16c, the fixed contact 19, the movable member 13 of the rotary switch and the contact 20. This constitutes a "one" at the input 46 of the NOR gate 42 and therefore the output of this gate will be a "zero". Consequently the transistor 50 is cut off and the electromagnet 6 is de-energized.

If the key 4 is now turned from the position I towards the position O, the rotary member 13 of the switch turns together with the key thereby interrupting the electrical connection between the fixed contacts 19 and 20. Therefore, at the input 46 of the fourth NOR gate 42 there now appears a "zero", and consequently the output of the fourth NOR gate 42 goes to "one", which turns on the transistor 50 and energizes the electromagnet 6.

The movable core 8 of the electromagnet 6 then advances into the steering lock device 1 to prevent the displacement of the bolt 5 from the retracted position to the extended position. This can take place, for example, as described with reference to FIG. 2, by the effect of locking the cam 12 in an angular position corresponding to a position intermediate between the positions I and O of the switch, but sufficiently displaced from position I to permit the ignition circuit to be switched off. The movable core 8 of the electromagnet 6, could, alternatively, directly lock the bolt 5 as described with reference to FIG. 3.

Figures 6, 7:
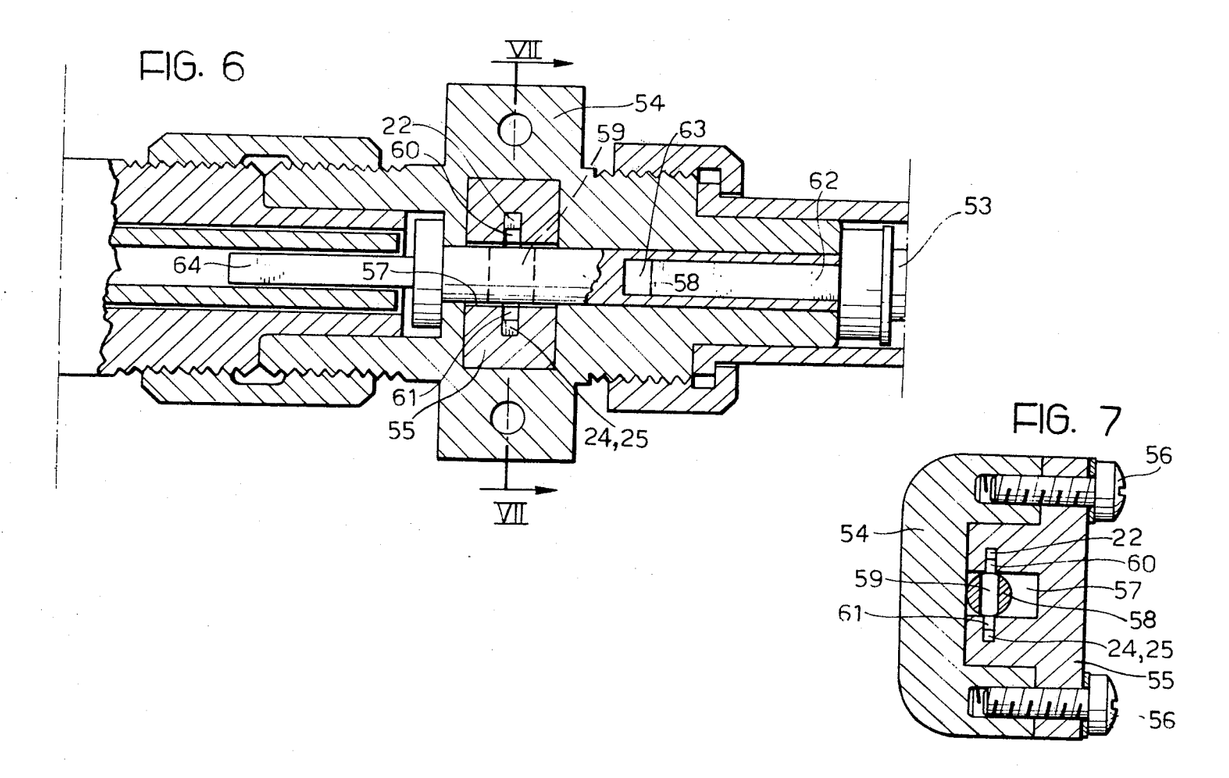
FIG. 6 is an axial section of a device, suitable for use in the system of FIG. 1 or that of FIG. 4, for detecting whether the vehicle is in motion or is stationary.
FIG. 7 is a transverse section taken on the line VII—VII of FIG. 6.

Referring now to FIGS. 6 and 7, there is shown a practical embodiment of the detector device for detecting whether the vehicle is stationary or in motion. This device is driven by the flexible cable 53, which drives the existing speedometer on board the vehicle. The device comprises a hollow support constituted by two support elements 54, 55 fixed together by means of screws 56. In a cavity 57 of the hollow support element 55 there is rotatably mounted a shaft 58, a portion of which has a transverse slit 59. The support element 55 also has two radially opposed grooves 60, 61 which open into the cavity 57 at a position corresponding to that of the slit 59 in the shaft 58. The grooves 60, 61 respectively contain the light emitting diode 22 and the assembly constituted by the phototransistor 24 and the switching transistor 25.

The end of the flexible drive cable 53 has a prismatic head 62, for example square, which engages in a correspondingly shaped prismatic cavity 63 in the shaft 58 whereby to couple these two for rotation together. The end of the shaft 58 opposite that which engages the drive cable 53 has a prismatic part 64 (either a square head or cavity) for the transmission of drive to the speedometer either directly or via a further length of drive cable, not shown.

When the vehicle is in motion, the shaft 58 rotates and the slit 59 permits the light emitted by the light emitting diode 22 to pass periodically towards the phototransistor 24, while when the vehicle is stationary the radiation is either intercepted by shaft 58 or allowed continuously to pass through the slot 59 in dependence on the position in which the shaft 58 comes to rest.

What is claimed is:

1. In a motor vehicle anti-theft steering lock device of the type incorporated with the motor vehicle ignition switch having a key operated ignition switch lock including a rotatable cylinder, said steering lock including a steering lock bolt displaceable between an extended position in which it engages the steering column of the vehicle and a retracted position in which it is spaced from the steering column, resilient biasing means urging said steering lock bolt towards said extended position, a rotatable cam rigidly connected to said rotatable cylinder of said ignition switch lock holding said steering lock bolt in said retracted position against the action of said resilient biasing means when said key is in position in said ignition switch lock, safety means operable to allow displacement of said steering lock bolt from said retracted position to said extended position thereof only upon withdrawal of said key from said ignition switch lock when said rotatable cylinder thereof is in a position where the ignition switch is turned off, further safety means comprising:

detector means for sensing whether the vehicle is in motion or is stationary, said detector means operating to provide a first output electrical signal when the vehicle is in motion and a second output electrical signal when the vehicle is stationary, an electronic circuit connected to the output of said detector means and operating in response to said first and second output signals to provide at its output a control voltage when the vehicle is in motion, and electromagnetic locking means connected to the output of said electronic circuit and operating in response to said control voltage to prevent the displacement of said steering lock bolt from said retracted position thereof to said extended position thereof whenever the vehicle is in motion, wherein the said electronic circuit comprises:

an input terminal, a capacitor connected between said input terminal of said circuit and ground, a voltage source, an electrolytic capacitor connected between said voltage source and ground, a Zener diode connected by one terminal to said voltage source and by the other terminal to ground, a first NOR gate having two inputs, which are both connected to said input terminal of said circuit, a second NOR gate having two inputs one of which is connected through an RC unit, constituted by a capacitor and a grounded resistor, to the output of said first NOR gate, a third NOR gate having two inputs which are connected together and to a capacitor which is connected to the output of said second NOR gate, the output of said third NOR gate being connected to the other input of said second NOR gate, a resistor connected between the input of said third NOR gate and the non-grounded terminal of said Zener diode, a fourth NOR gate having two inputs one of which is connected, through a unit constituted by a diode in parallel with a resistor, to the output of said second NOR gate, and the other of which is connected to a junction point between two resistors one of which is grounded and the other of which is connected to control terminal of the circuit, an electrolytic capacitor connected between said one input of said fourth NOR gate and the non-grounded terminal of said Zener diode, and a transistor the base of which is connected through a resistor to the output of said fourth NOR gate, the emittor of which is connected to ground, and the collector of which is connected to said voltage source through a diode, said collector constituting the output of said circuit.

2. The safety system of claim 1, wherein said steering lock includes a rotatable member turnable by means of said key, said rotatable member being engaged by said electromagnetic locking means when said electromagnetic locking means are energized by said output voltage from said electronic circuit, whereby said rotatable member is locked in an angular position which it occupies when said ignition switch is in a position intermediate between that which it occupies when the ignition circuit is interrupted and that which it occupies when the key is released for removal from said ignition lock.

3. The safety system of claim 2, wherein said rotatable member which is engaged by said electromagnetic locking means is a cam the position of which determines the position of said steering lock bolt.

4. The safety system of claim 2, wherein said electromagnetic locking means include an electromagnet comprising a winding and a movable core, said winding being connected across the output of said electronic circuit and said movable core being operable to engage, when displaced upon energization of said winding, into a recess in said rotatable member of said steering lock whereby to lock this member in said intermediate angular position thereof.

5. The safety system of claim 1, wherein said electromagnetic locking means include an electromagnet having an energizing winding and a movable core, said winding being connected across the output of said electronic circuit and said movable core being operable, when said winding is energized, to engage in a recess in said steering lock bolt whereby to lock said bolt in its retracted position when the vehicle is in motion.

6. The safety system of claim 1, wherein said electronic circuit operates to generate said output control voltage only if said key is turned in said ignition switch to turn said ignition switch to the position where the ignition circuit is interrupted when the vehicle is moving, said control voltage thus generated energizing said electromagnetic locking means after said ignition switch has reached said angular position where said ignition circuit is interrupted but before it reaches said angular position where said key can be withdrawn.

7. The safety system of claim 1, wherein said detector means for detecting whether the vehicle is in motion or is stationary comprises:

a source of electromagnetic radiation and a photodetector positioned to receive electromagnetic radiation generated thereby, the output of said photodetector being connected to the input of said electronic circuit; said photodetector providing at its output a different signal according to the coupling conditions between the source of electromagnetic radiation and said photodetector, and means for obtaining different coupling conditions between said source of electromagnetic radiation and said photodetector according to whether the vehicle is in motion or is stationary.

8. The safety system of claim 7, wherein said source of electromagnetic radiation is constituted by a light emitting diode and said photodetector is a phototransistor the collector of which is connected by means of a resistor to a voltage source, and a switching transistor the base of which is connected to the emitter of said phototransistor, the collector of which is connected to the collector of said phototransistor, and the emitter of which is connected to ground.

9. The safety system of claim 7, wherein said different coupling conditions between said radiation source and said photodetector are respectively a condition of repeatedly interrupted coupling and a static condition, and said means for generating said coupling conditions comprise:
- a support constituted by two elements defining a cavity therebetween,
- a shaft one portion of which has a transverse slit rotatably mounted in said cavity of said support; one element of said support having two grooves one on each side of said cavity adjacent said transverse slit portion of said shaft, said grooves housing said source of electromagnetic radiation and said photodetector respectively,
- means for driving said shaft to rotate when the vehicle is in motion, whereby said transverse slit of said shaft periodically permits the passage of radiation from said radiation source to said photodetector thereby determining said condition of repeatedly interrupted optical coupling, said condition of static coupling occurring when said vehicle, and consequently said shaft, is stationary and said transverse slit allows continuous passage of radiation if it is aligned with said grooves housing said radiation source and said photodetector or continuously prevents the passage of radiation if it is in a non-aligned position with respect to said grooves housing said radiation source and said photodetector.

10. The safety system of claim 9, wherein said means for driving said shaft to rotate when the vehicle is in motion are constituted by the flexible cable for driving the existing speedometer on board the vehicle.

* * * * *